March 9, 1937. J. WETSTEIN 2,073,273
MEANS FOR PREPARING BEVERAGES
Filed March 31, 1932 2 Sheets-Sheet 1
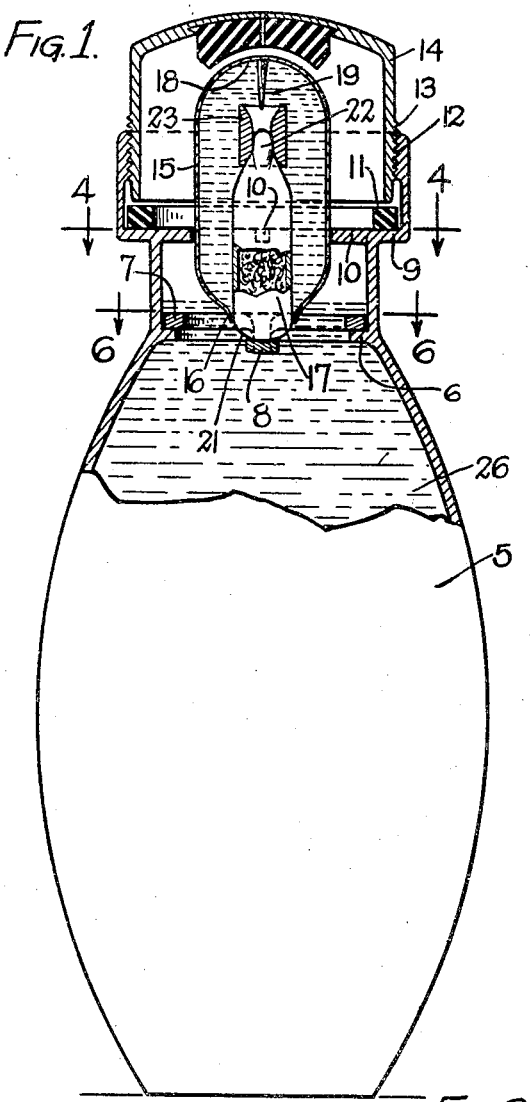
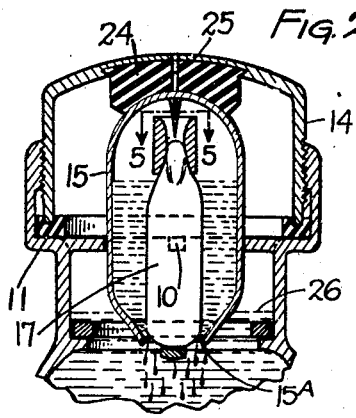
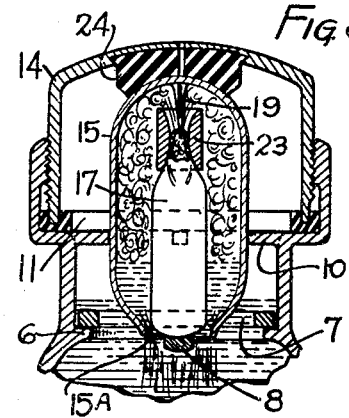
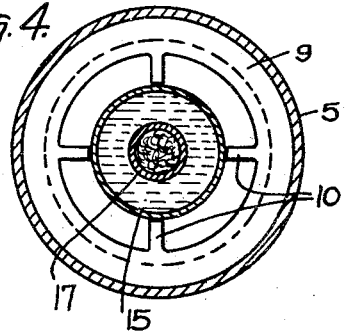
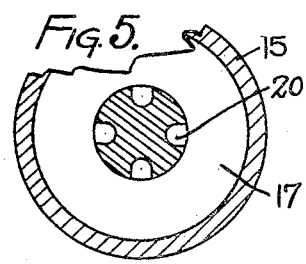
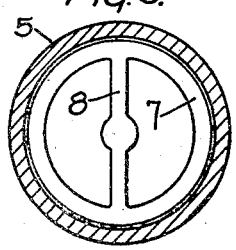
Inventor
JACOB WETSTEIN
John J. Lynch
his Attorney March 9, 1937. J. WETSTEIN 2,073,273
MEANS FOR PREPARING BEVERAGES
Filed March 31, 1932 2 Sheets-Sheet 2
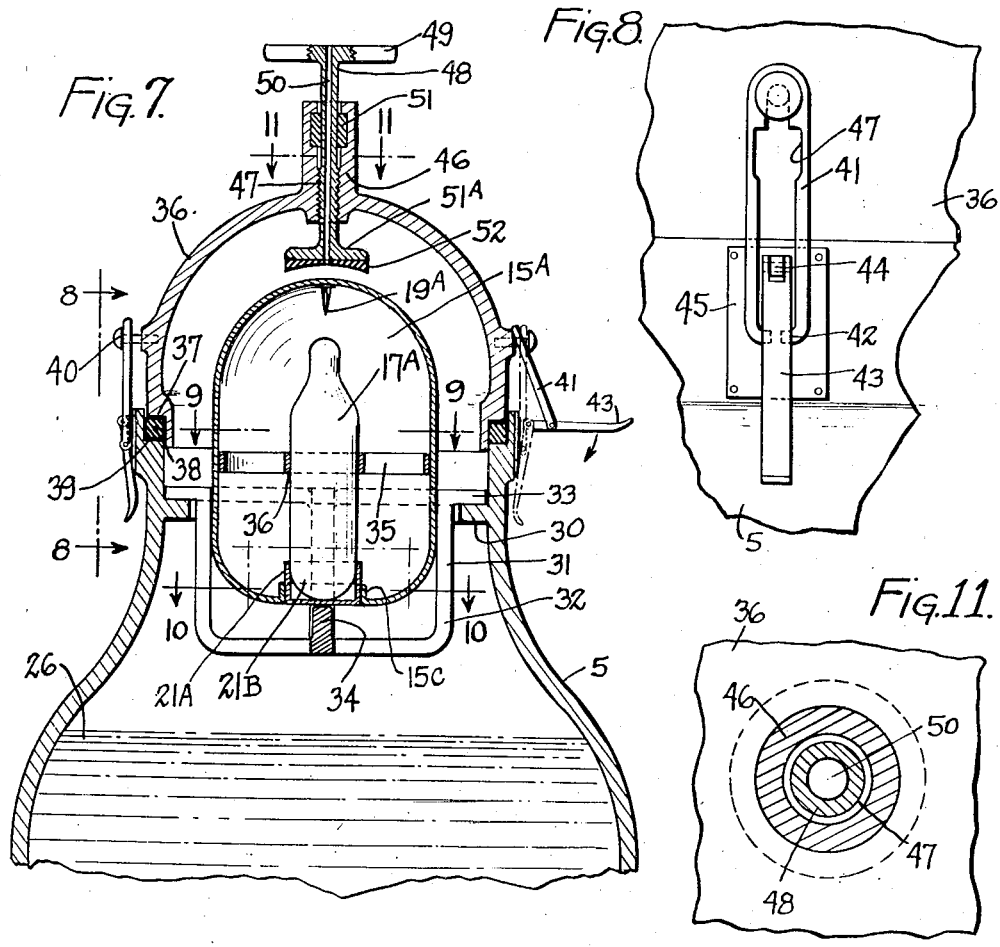
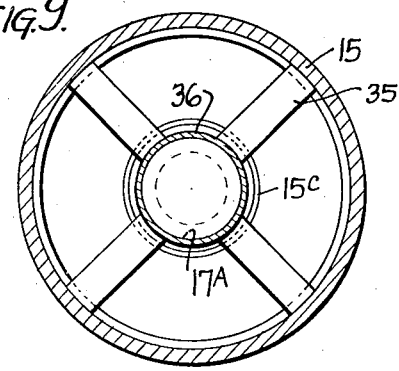
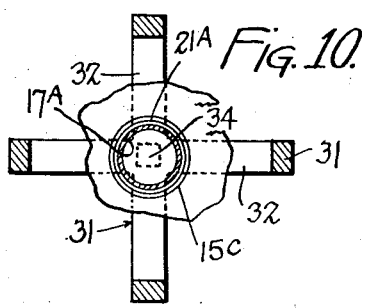
INVENTOR
JACOB WETSTEIN
BY HIS ATTORNEY Patented Mar. 9, 1937

2,073,273

UNITED STATES PATENT OFFICE 2,073,273

MEANS FOR PREPARING BEVERAGES

Jacob Wetstein, New York, N. Y.; Erna Korn and Florence W. Winters executrices of said Jacob Wetstein, deceased Application March 31, 1932, Serial No. 602,378. In Great Britain and Canada November 25, 1931

4 Claims. (Cl. 225—18)

This invention relates to a method and means of preparing a liquid by the use of a combination member which contains a drink ingredient and carbon dioxide; the said drink ingredient and carbon dioxide being injected into the liquid to be prepared, and a simple means through the use of which, the top pressure produced, is released.

The most important object of my invention is to provide a method and means whereby a drink can be prepared as needed by the individual.

This drink may be of any variety of flavored sweetened, carbonated beverage. It may be a carbonated water. It may be a carbonated mineral water of the desired medicinal value by the use of prepared salts.

Other and equally important objects of my invention are the elimination of the use of bottles in which liquids of the type I may prepare, are usually dispensed or brought into the home to be subsequently thrown away or returned for the repayment of the deposit, which is time wasting and expensive.

My invention also reduces the transportation costs as bottles and water used in beverages are dispensed with, only a single container being kept where the drink is to be actually prepared, at which place the water is obtained preparatory to making the beverage.

My invention is also clean and sanitary in that it prevents the spread of contamination that might result from the use of returned bottles which may not have been thoroughly cleansed.

A still further object of my invention is to provide, through the use of my invention, a better result than could be obtained if flavor or syrup or other ingredient were added to an open tumbler of carbonated water inasmuch as the best result is obtained by injecting the flavor and the gas into a closed container of liquid.

With these and other objects in view, my invention comprises the construction, combination and arrangement of the various parts hereinafter described, and then particularly pointed out in the appended claims.

In the drawings:—

Figure 1 is a view in elevation partly in section showing how my invention is employed, in the production of a carbonated liquid. The figure shows how the container and cap therefor would appear after the combination member containing the drink ingredient and carbon dioxide, hereinafter referred to as the refill member, is positioned in the top of the container.

Figure 2 is a view in sectional elevation of the top of the container similar to that illustrated in Figure 1, but showing the first position of the ingredient shell and the gas cartridge after the cap has been threaded down to force the shell off the cartridge.

Figure 3 is a view similar to Figure 2 showing a still further movement of the cap which causes the piercing of the gas cartridge which is positioned within the ingredient shell so that the gas is released and not only forces the contents of the shell out but injects the gas and the ingredient into the fluid to form the prepared liquid.

Figure 4 is a section taken on the line 4—4 of Figure 1 and illustrates the method for holding the shell and cartridge combination in vertical position within the container.

Figure 5 is a section taken on the line 5—5 of Figure 2 and illustrates the slotted pin employed in piercing the end of the gas cartridge, and Figure 6 is a section taken on the line 6—6 of Figure 1 illustrating the refill holding member employed in the upper end of the receptacle.

Figure 7 is an enlarged view in section of the top of a receptacle in which is housed the refill member, the receptacle being closed with a cap in which is positioned a further form of refill operating device, the view also showing different means for fastening the cap to the receptacle.

Figure 8 is an enlarged section taken on the line 8—8 of Figure 7 and illustrates the construction of the cap fastening means.

Figure 9 is a section taken on the line 9—9 of Figure 7 and illustrates the method of supporting the cartridge within the refill or liquid shell.

Figure 10 is a section taken on the line 10—10 of Figure 7 and illustrates the construction of the bridge member upon which the refill is supported, and Figure 11 is an enlarged section taken on the line 11—11 of Figure 7 illustrating the construction of the plunger and its vent passage.

This application is a continuing application of Serial No. 498,095, filed November 25, 1930, by Jacob Wetstein for patent on Method and means for preparing a liquid and includes all of the subject matter of said application.

Referring to the drawings in detail, 5 indicates a liquid receptacle of bottle shape of any particular contour desired and made from a non-corrosive metal, preferably. The receptacle is provided with an inwardly extending flange 6 adjacent its open end, which flange, if desired, may be replaced by tongues or another suitable medium for the support of the bridge disk 7, whose center strap 8 being of a concave nature, is arranged to self-center and support the refill member.

The receptacle 5 may also be provided with a shoulder 9 and extended lips 10, the latter of which constitutes centering fingers for the refill member. The shoulder 9 constitutes a seat for the cap washer 11 which is preferably constructed of some soft, compressible material such as rubber which will effectively seal the space between the lower edge of the cap and the shoulder 9 of the receptacle. The upper end of the receptacle 5 is internally threaded as at 12 to receive the threaded portion 13 of a cup 14. This cap is preferably made from the same material as the container 5 and may be knurled or ribbed on its exterior surface to provide a convenient means for threading into or out of the receptacle. Instead of the screw threads employed in this particular instance, I may provide a quick locking means for positioning the cap in place which will serve the same purpose as the threaded mounting.

The refill member which constitutes the important part of my invention consists of the outer shell 15, the open end of which is constricted as at 16 and arranged to be closed by the insertion therein of the gas cartridge 17. The upper end of the shell at 18 carries on its interior and at the said end, the piercing pin 19, which, as illustrated in Figure 5, is provided with the slots or flutes 20 which permit escape of the gas from the cartridge 17 when the end of said cartridge is pierced by the pin. The pin 19 is secured to the inner wall of the shell in any suitable manner. The cartridge 17 employed for holding the carbon dioxide gas is made of non-corrosive metal, the walls of which are sufficiently thick to withstand a high pressure and the rounded lower end 21 of the cartridge extends slightly beyond the end of the shell and is arranged to rest on the bridge 8 of the support ring 7. The inner end of the cartridge is reduced in diameter and provided with a blunt end 22 which has secured thereto in any manner, the guide ferrule 23, the purpose of which is to locate the piercing pin 19 and permit quick assemblage of the cartridge 17 with the shell 15 in manufacture. The cap 14 at the center thereof and on its inner top surface has a compressible washer 24 which, as well as the top 14, is provided with a central bore 25 constituting a vent opening for the release of the top pressure to be described.

The shell 15 containing the gas cartridge is sold to the consumer in the form illustrated in Figure 1, it being presumed that the consumer has a receptacle of the type illustrated for the particular employment of the refill member and the refills constituting the shell 15 and the cartridge 17 in the assembled relation illustrated in Figure 1, are operated upon by the action of the cap to form the prepared liquid. The shell 15 may contain any sweetened or unsweetened flavoring fluid or concentrate for the production of a beverage. It may contain a salt solution for the production of a mineral water having certain desired medicinal properties. The cartridge 17 will be filled with carbon dioxide which, when released, will force the ingredient out of the shell 15 and itself, pass into the water to form a carbonated fluid.

The best results are obtained in preparing the liquid in a closed container of the type illustrated and the arrangement of the parts and operation of my device not only promotes the proper making of the fluid but is sufficiently simple in construction so that the housewife can prepare a carbonated beverage in a few minutes, that will excel in quality beverages prepared by mixing carbonated water and flavoring matter in an open receptacle.

As a first step in the operation of the device, the refill member which constitutes the flavor or ingredient holding shell 15 and the gas cartridge 17 are positioned as illustrated in Figure 1 and the cap 14 is threaded thereover until, as shown in Figure 2, the washer 11 is engaged by the lower peripheral edge of the cap to seal the receptacle at the point after which the washer 24 comes into contact with the top of the shell 15 and the latter is forced downwardly until the edge of the opening 15—A of the shell 15 is moved away from the wall of the cartridge 17 to provide an opening to permit flow of the flavoring liquid or ingredient contained in the shell 15. At the same time that the gasket 24 comes into contact with the outer, upper surface of the shell 15, the vent 25 is sealed, thus maintaining a closed receptacle and one which is air and liquid-tight. Further screwing of the cap 14 downwardly to the position indicated in Figure 3, further compresses the washer 11 and causes the washer 24 to move the shell 15 downwardly until the piercing pin 19 carried in the inside thereof, pierces the upper end of the gas cartridge 17 with the result that the gas is released and forces the flavor or ingredient out of the shell 15 into the liquid 26 which is to be prepared. After the pin 19 has pierced the cartridge, the lower edge of the shell rests on the bridge 8. When the gas has been released, it will, in addition to carbonating the liquid 26 and removing the contents of the shell 15, produce a top pressure. Should the cap be removed at this time, the carbonated beverage would foam up and the prepared fluid would boil over the top of the receptacle which makes it highly important to guard against, because it ruins the drink and is otherwise highly objectionable. In order to prevent this, a feature of my invention contemplates the use of the vent 25 and the relation of the washer 24 and the washer 11. It will be noted that when the cap 14 was threaded down, washer 11 was first engaged by the lower peripheral edge of the cap, thus providing a cap seal, after which the washer 24 engaged the upper end of the shell 15 to seal the opening 25. A reverse movement of the cap or an unthreading movement thereof, will, therefore, first release or disengage the washer 24 from the upper surface of the shell 15 with the result that the small vent 25 will be open and passage of the top pressure gas may exude through the vent 25 without causing foaming or boiling of the liquid contents of the container 5. When the cap is removed the refill member may be thrown away and the contents of the receptacle 5 can then be poured out.

In the modified form of my invention, the receptacle, indicated by the numeral 5, is provided with an annular ledge 30 upon which is positioned a bridge 31 constituting a support for the refill unit and also a guide when the same is positioned in the receptacle. This bridge 31 consists of the depending arms 32, the upper ends of which are turned over as at 33 to rest on the ledge 30 while the depending portions 32 at their central meeting point are provided with an upstanding cartridge rest 34, upon which is supported the cartridge cup 21—A which is force fitted over the curved end 21—B of the gas cartridge 17—A. The lower end of the shell 15—A is provided with an inwardly flanged opening, the flange 15—C of which frictionally holds the cup 21—A therein so that the closed end of the cup is flush with the outer surface of the shell 15—A, which holds the liquid to be forced by the gas when it is released from the cartridge into the liquid to be prepared. This shell 15—A may be provided with a guide ring 35 positioned in any suitable manner therein so that the central ring 36 thereof holds the cartridge 17—A in upright position so that the piercing pin 19—A in the shell 15—A will properly pierce the cartridge. This cup 21—A also serves as a guide in properly supporting the cartridge when it is pierced to release the gas.

The receptacle 5 in which the liquid 26 to be prepared is held, is closed at its upper end through the medium of a cap 36 flanged at its lower end as at 37 to fit over a gasket 38 positioned on a ledge 39 at the upper end of the receptacle 5. In order to quickly place or remove the cap 36, I have provided the same with headed pins 40 at the opposite sides thereof, or at any desired points on the periphery thereof which are arranged to be engaged by the yoke link 41 which is pivoted as at 42 in a latching hasp arm 43 pivoted in turn as at 44, to an extension or ear of a plate 45 which is secured in any suitable manner adjacent the upper end of the receptacle 5. The pivot point 44 of the hasp arm 43 being above the pivot point 42 of the link 41, will cause, when the hasp arm is drawn down in the position indicated in outline in Figure 7, and in the direction indicated by the arrow in said figure, a tightening of the cap against the gasket 38 and the hasp will act as a latch and will prevent accidental removal or loosening of the cap 36 when once the fastening device has been secured, as illustrated. In order to release the cover, it is simply necessary to raise the hasp arm 43 until the centers 42 and 44 are out of alignment at which time the hasp arm is continued in its raising movement until the link 41 can be removed over the headed pin 40 through the medium of its enlarged cut-out portion 47, provided for this purpose.

The means of releasing the top pressure after the formation of the drink, as indicated in Figure 1, contemplates the unthreading of the cap 14 and in order to minimize the effort required, I have, as shown in Figure 7, provided the cap 36 with a sleeve 46 in which is threaded as at 47, a plunger shaft 48, the upper end of which is formed to provide a handle 49 and the plunger shaft itself is provided with a hollow bore 50 constituting a vent.

The plunger passes through the sleeve 46 and through a packing gland 51 which prevents leakage through the sleeve 46. The plunger at its lower end and inside the cap 36 is provided with a plunger plate 51—A the under side of which is covered by a yieldable seating gasket 52, the vent 50 passing through the gasket and the plunger plate. It is evident that, as illustrated in Figure 7, a downward movement of the plunger 48 by threading will bring the gasket 52 into contact with the upper surface of the shell 15—A and further movement downwardly of the plunger will force the shell off the cartridge cup 21—A until the flange 15—C of the shell is free of the cup 21—A and the liquid content of the shell 15—A can escape. At this time further downward movement of the plunger will cause the pin 19—A to pierce the gas cartridge to release the gas and form the drink as hereinbefore described.

To release the top pressure however, it is simply necessary to unscrew the plunger so that it moves upwardly through the sleeve 46 a sufficient distance to permit separation of the gasket 52 from the outer, upper surface of the shell 15—A, at which time the gas will escape through the vent and the cover or cap 36 may then be quickly removed without boiling over of the contents of the receptacle 5 which would be the case were the top pressure to be suddenly released.

It is evident, therefore, that I have provided a method and means whereby a carbonated liquid can be prepared either in beverage form or for other uses and liquid can be prepared at the time that it is to be used so that it will be absolutely fresh and will have a high content of carbon dioxide which imparts to the prepared liquid, life and sparkle, and prevents it from quickly becoming flat.

Another feature of my invention is that the combination of the flavor container and the gas container sold in a unit, known as a refill, makes possible, the selling of these refills in convenient quantities which can be stored in a small space, or may be kept indefinitely in an unchilled atmosphere and when used with cold water of a suitable temperature, will produce a fluid of the desired properties.

It is evident also, that the self contained flavor and gas combination is sanitary, will considerably reduce the cost of carbonated beverages by doing away with bottles, the cost of sterilizing bottles, will reduce transportation cost, as the bottles and bottled beverage are eliminated and a single container is all that is necessary to store and use for the preparation of beverages of any kind.

The flavor shell 15 may contain any kind of flavor desired for a beverage, and as before mentioned, any kind of salt solution that will produce a mineral water having predetermined medicinal value.

It is evident also that my invention provides for the ideal method of making a carbonated beverage in that it injects the syrup and the gas into the liquid to be prepared in a closed container. Further, the flavoring or ingredient is prevented from deteriorating by reason of the airtight contact between the shell 15 and the gas cartridge 17 and the metal employed in the construction of all of the parts may be such that corrosion or contamination is prevented.

Other advantages present in my invention are simplicity of construction, manufacture at low cost, a high degree of efficiency in use, and complete elimination of the possibility of the bursting of the container due to gas pressure.

My invention is not to be restricted to the precise details of construction shown since various changes and modifications may be made therein without departing from the scope of the invention or sacrificing the advantages derived from its use.

What I claim is:—

1. As an article of manufacture, a drink ingredient shell and a gas cartridge within the shell, said cartridge constituting a closure for the shell and said shell and cartridge being relatively movable to provide an opening in the shell.

2. As an article of manufacture, a drink ingredient shell, a gas cartridge movably positioned within the shell, one end of said cartridge constituting a closure for the shell, and means for piercing said cartridge upon a relative movement of said shell and cartridge, whereby the gas in the cartridge will force the drink ingredient out of the shell.

3. As an article of manufacture, a drink ingredient shell, a gas cartridge within the shell, said cartridge constituting a closure for the shell and being movable relatively thereto, means for piercing said cartridge on a relative movement of said shell and cartridge to permit the gas in the cartridge to discharge the contents of said shell, and a guide associated with the cartridge.

4. As an article of manufacture, a drink ingredient shell, a gas cartridge within the shell, a cup end on said cartridge constituting a closure for said shell, and said shell and cartridge being relatively movable to force the cup end out of said shell and provide an opening in the latter.

JACOB WETSTEIN.